Dec. 5, 1950 J. H. HOMRIGHOUS 2,532,310

TIME-DIVISION MULTIPLEX RADIOPHONE SYSTEM

Filed July 24, 1947 3 Sheets-Sheet 1

INVENTOR.

John H. Homrighous

Dec. 5, 1950 J. H. HOMRIGHOUS 2,532,310

TIME-DIVISION MULTIPLEX RADIOPHONE SYSTEM

Filed July 24, 1947 3 Sheets-Sheet 2

INVENTOR.

John H. Homrighous

Dec. 5, 1950 J. H. HOMRIGHOUS 2,532,310

TIME-DIVISION MULTIPLEX RADIOPHONE SYSTEM

Filed July 24, 1947 3 Sheets-Sheet 3

INVENTOR.

Patented Dec. 5, 1950

2,532,310

UNITED STATES PATENT OFFICE 2,532,310

TIME-DIVISION MULTIPLEX RADIOPHONE SYSTEM

John H. Homrighous, Oak Park, Ill.

Application July 24, 1947, Serial No. 763,251

32 Claims. (Cl. 250—9)

This invention relates to a radio communication system and more particularly to a time division two-way communication system.

One of the main objects of my invention is to provide a number of pairs of channels with consecutive recurring periods for private two-way conversation through a common transmission lane or path.

Another object of my invention is to provide each transmitter-receiver in the communication system with individual incoming and outgoing channels in the common transmission lane.

Another object is to provide means at each transmitter-receiver station to select the particular channels associated with any station to signal and afterwards talk to the party at the desired station.

Another object is to provide a radio time division communication system, whereby a calling station may select both the outgoing and incoming channels to any station in a relatively large group of stations.

Another object of my invention is to provide improved means whereby a plurality of messages or two-way conversations may be transmitted intermittently over a single transmission lane or carrier waves of the same frequencies.

Another object of my invention is to provide an improved radio communication system for communication between mobile radio stations, and between mobile and fixed stations.

A further object of my invention is to provide improved means at each transmitter-receiver station in a radio communication system, whereby the station producing synchronizing signals with the highest frequency may transmit or broadcast the synchronizing signals for synchronizing all the other stations.

Still another object is to provide a radio communication system comprising groups of relatively small number of stations and other groups of relatively large number of stations, whereby any station in any group may select an outgoing channel and an incoming channel to and from any other station in any group for two-way secret messages.

A message in this specification is to be understood to include any intelligence or any portion of any intelligence representative of voice controlled electrical signals, or facsimile, telegraph and other coded electrical signals.

A channel in this specification is to be understood as a one-way path for the transmission of electrical signals between distant stations, or a path for the transmission of electrical signals during recurring periods of time, and may be one of a number of carrier wave channels in a transmission path or lane for the transmission of signals representative of any intelligence and/or control signals.

Mobile stations referred to in this specification are to be understood as the radio transmitter and receiver stations located in an airplane, train, truck, bus, taxicab, boat, tank or any other vehicle.

The time division radiophone communication system of the instant invention is applicable to many communication services by wireless transmission such as may be required for isolated or rural areas, urban communities, buses, trucks, taxicabs, airplanes, etc.

The radio system of the instant invention comprises a plurality of stations each assigned individual incoming and outgoing channels so that a number of two-way communications may be taking place at the same time over carrier waves of the same frequency transmitted intermittently. One wave length may be employed for a relatively large group of stations, and other wave lengths may be for calling stations in other groups. One station may transmit fregmentary portions of signals representative of a message during selected periods, and the other stations may transmit signals during other selected periods. Likewise the receivers in each station may receive message signals during selected periods.

One, two or three digit numbers may be assigned to each station depending on the number of stations assigned to a carrier wave path. Each station has a pair of numbered channels, one channel outgoing and another channel incoming, by which the station may be signaled or called.

The invention in the instant case may be considered as an improvement over the communication system described in application Serial No. 558,931 filed on October 16, 1944. In the above application each station was assigned only an incoming numbered channel over which it could be signaled. This single channel arrangement required the called party to select a return channel or the calling station channel in order to answer the call. In the instant invention the calling party selects both the outgoing and incoming channels by station number for any desired station so that the called party need only to remove the microphone from its hook to answer the call.

The instant invention, so far as is known, shows the only communication system whereby any station may select by number an outgoing channel and an incoming channel to and from any other station for two-way secret messages.

In this invention I employ high or ultrahigh frequency carrier waves amplitude modulated; however, it is to be understood that the principles involved may be equally applicable to carrier waves of any other frequency, and also frequency or phase modulation.

Other objects and advantages of my invention will appear from the following description, taken in connection with the accompanying drawings in which.

Figure 1:
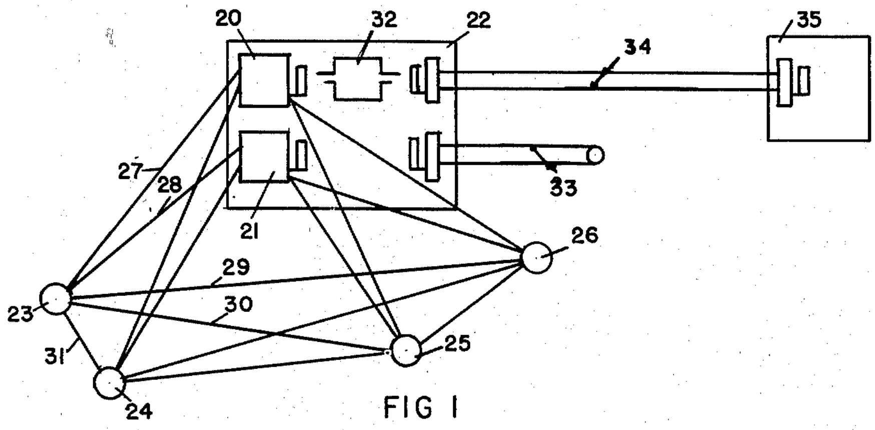
Figure 1 is a diagrammatic illustration of a radio system having a small group of stations with certain of the stations located in telephone offices.

Figure 1 shows a group of radio communication stations each comprising a transmitter and a receiver for the transmission and reception of message signals over carrier wave channels intermittently. Several stations may call or signal other stations over carrier waves of the same length, but in different recurring periods of time. Stations 20, 21 may be located in a telephone office 22. Stations 23, 24, 25 and 26 may be mobile or fixed stations. These transmitter-receiver stations may be alike except the stations located in the telephone offices may be equipped with terminal jacks so that cord circuits may be utilized for inteconnecting the radio channels with telephone lines.

While I have shown a very small group of radio stations in Figure 1, it is to be understood that the number of stations per group may be one hundred or one thousand with each station having a two digit or three digit call number to be further explained later. Other similar groups of radio stations may be called by transmitting other carrier waves.

Station 23 may select two channels to any other station in the group as indicated by the lines 27 through 31; likewise stations 24, 25 and 26 may each select an outgoing and an incoming channel to any other station in the group as indicated by the connecting lines. Stations 20 and 21 located in the telephone office may each select two channels to each of the mobile or fixed stations.

The carrier waves transmitted by the several stations in a group for signaling and talking between stations in the same group may be of like frequency, but transmitted in different recurring periods of time. Two-way conversation between pairs of stations may be during two consecutive recurring periods or over two carrier wave channels.

The individual stations may comprise a transmitter and a receiver. The transmitter may transmit fragmentary portions of message signals intermittently or during selected periods or a message from one station may be transmitted during a certain recurring period and a message from a second station may be transmitted during a different recurring period, no two stations to transmit during the same period of time. The receivers may be arranged to reproduce received message signals during selected periods or through selected channels. Each station may also through switch mechanism in standby position be capable of receiving alarm or ringing signals, and message signals through a numbered station call channel. The number assigned to the station call channel may be the station call number.

Stations 20 and 21 in the telephone office may be equipped with terminal jacks so that a conventional cord circuit 32 of a type well known may be utilized for interconnecting the radio channels to a subscriber's line 33 or a trunk line 34 to a second telephone office 35. Message signals from the stations 20 and 21 may be transmitted over the subscriber's line 33 and the trunk line 34 intermittently. The trunk line 34 may be arranged for either battery or carrier wave transmission. Telephone subscribers in either office may originate calls to any of the stations 23 through 26.

Figure 2:
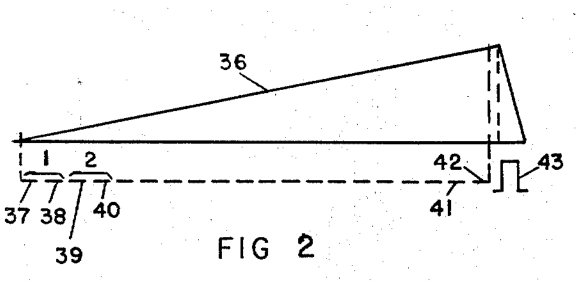

Referring to Figure 2 the sawtooth or timing wave illustrated at 36 may be one of a series produced in any of the radio stations shown in Figure 1 for controlling the channel selecting apparatus to allot different periods of time for the transmission and reception of message and control signals. The interval of each wave may be divided into a number of smaller units or periods as illustrated at 37 through 42, like periods in each wave may constitute a channel and two like consecutive periods such as 37 and 38 may be given a number and assigned to a particular station. For instance the channels 37 and 38 may be two channels assigned to station 1 as indicated in Figure 2 which may correspond to station 20 in Figure 1. Likewise channels 39 and 40 may be assigned to station 2 in Figure 2 which may correspond to station 21 in Figure 1, etc. While I have shown channels for a ten station system in Figure 2, it is to be understood that the number of stations may be more or less as desired.

In small groups of radio stations, only one series of sawtooth waves may be produced to control the selected periods in each sawtooth wave for the transmission and reception of message signals. Each station in a group may call any other station in the group by transmitting a modulated carrier wave during the selected periods corresponding to the channel assigned to the desired station.

Synchronizing or control signals (one control signal is illustrated at 43) may be produced and transmitted during the final period in each sawtooth wave to synchronize the sawtooth generators in the called station. This synchronizing signal may be produced shortly after the last channel period as illustrated.

Figures 3, 4:
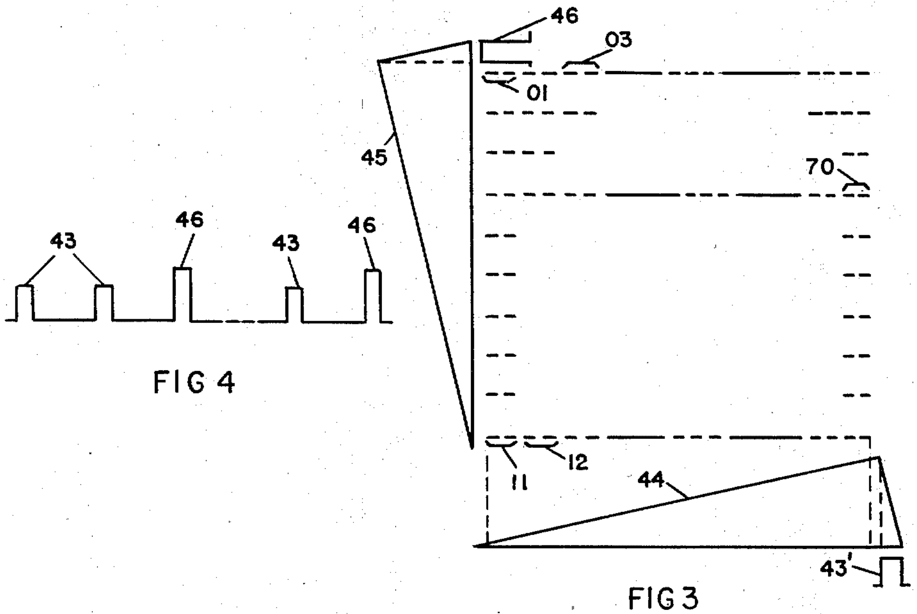
Figures 2 and 3 are diagrammatic illustrations of channel or station numbering schemes for time division communication systems.
Figure 4 is a diagrammatic illustration of the control or synchronizing signals used in this invention.

Figure 3 illustrates a period of time frame or frame pattern whereby one hundred radio stations may be assigned individual outgoing and incoming channels numbered to correspond to the station number. This system may employ two series of sawtooth waves; the frequency of one series may be ten times the fequency of the other series. One line sawtooth wave is illustrated at 44 and one frame sawtooth wave is illustrated at 45. The interval of each horizontal wave may be separated into different periods as shown in Figure 2 and the interval for each vertical sawtooth wave may be divided into ten periods, one period for each horizontal line. Channel selecting equipment may be adaptable to select any two periods assigned to a station in any one of the ten horizontal lines for selecting an outgoing and incoming channel to any station in the group. Ten two period divisions in each of ten horizontal lines provide two channels for each of a hundred stations; however, it is to be understood each line and frame sawtooth wave may comprise a greater number of periods to increase the number of stations per group. Also there may be employed a third sawtooth wave to increase the number of frames as illustrated and described in the above mentioned application.

Any arrangement of numbers may be assigned to the various station channels indicated by pairs of short lines in Figure 3. But, in order to have an orderly scheme for assigning one hundred two-digit numbers to a group of stations I preferably number the lines one to naught bottom up (naught for the tenth line) and the double station periods in each line numbered one to naught left to right (naught for the tenth double period) so that the number assigned to any station may be the number of the station channels obtained by the line number for the tens digit and the position of the channels in the line for the units digit. For instance, the first two periods in line 1 would be channels 11 for station 11, and the second two periods in line 1 would be channels 12 for station 12. The channel position for station numbered 03 would be the third two periods in line naught, and the channel position for station 70 would be the last two periods in line 7.

Line and frame control signals illustrated at 43' and 46 may be transmitted between lines from one station to synchronize the sawtooth waves produced at the other stations.

In Figure 4 I have shown diagrammatically control or synchronizing signals for triggering the sawtooth waves. The impulses or signals 43 and 46 may be equally spaced to control and synchronize the sawtooth waves. The frame impulse illustrated at 46 may be of higher amplitude and appears between groups of line control impulses where a two sawtooth wave system is employed for a large group of stations.

Figure 5:
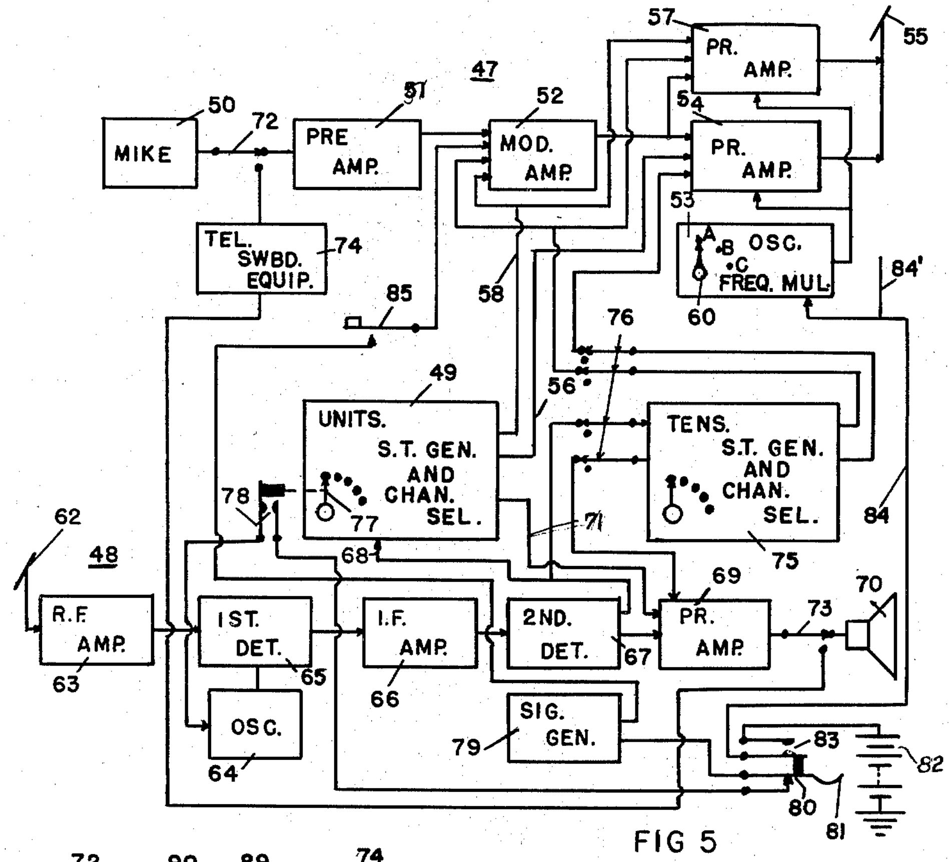
Figure 5 is a block diagram of a transmitter-receiver station.

Figure 5 shows a block diagram for a radio transmitter-receiver station which may be any one of the stations in Figure 1. This station may comprise a transmitter 47, receiver 48 and a sawtooth generator and channel selecting mechanism 49. The transmitter may transmit a modulated carrier wave during any selected period depending upon what station is called and also control signals in other periods. The receiver is capable of receiving message signals during selected periods and control signals during other periods.

The numeral 50 designates a microphone or any other known signal producing device for developing signals representative of a message which may be fed to the preamplifier 51. From the amplifier 51 the signals may be supplied to the modulation amplifier 52. An oscillator 53 and associated frequency multiplying circuits may produce a carrier wave in the high or ultra high frequency region or band. In the power amplifier 54 this carrier wave may be modulated by the message signals from the modulation amplifier 52 and fed to the antenna 55 intermittently or in selected recurring periods of time. The message signal power amplifier 54 may be blocked from supplying a modulated carrier wave to the antenna 55 except for relatively short recurring periods by impulses produced in the channel selecting mechanism 49 and applied over conductors 56. The periods in which a carrier wave modulated with message signals is supplied to the antenna 55 depends upon the channel or station number called. The carrier wave may be modulated with control signals in the control signal power amplifier 57 during other recurring periods. This amplifier is blocked to message signals, by suitable grid bias, and only supplies a carrier wave to the antenna 55 during periods intervening message signals when the control signals may be produced in the sawtooth generator at 49 and fed over the conductors 58 to the modulation amplifier 52 to modulate the carrier wave in the power amplifier 57 under control of the same control signals fed over the conductors 58 to the amplifier 57. The dial 60 may be rotated to marking A, B or C to tune the oscillator to produce carrier waves having different frequencies.

The antenna 62 may receive modulated carrier waves from another station or stations which are fed to the radio frequency amplifier 63. One antenna may be used for both the transmitter and receiver since signals are not transmitted and received in the same periods. An oscillator 64 reacts with these signals in the first detector stage 65 on the heterodyne principle to produce an intermediate frequency which is supplied to the intermediate frequency amplifier 66. After suitable amplification the frequency signals may be demodulated in the second detector stage 67 to obtain message signals and control signals. The control signals being of greater amplitude are separated from the message signals and fed over conductors 68 to the sawtooth generator at 49 where they may be utilized to control or synchronize the sawtooth generators with the sawtooth generators at a sending station. The message signals may be supplied from the demodulator 67 to the power amplifier 69. The output of the power amplifier 69 may be intermittent and the message signals may be fed to the loudspeaker or any other known type of message signal reproducer 70. The power amplifier 69 may be blocked from supplying message signals to the reproducer 70 except for relatively short recurring periods by period impulses produced in the channel selecting mechanism 49 and applied to conductors 71. The periods in which message signals may be supplied to the loud speaker 70 depends upon whether the station was called or whether a call was originated from the station through certain selected channels.

Should the transmitter-receiver or transceiver station shown in Figure 5 be employed in a telephone office or terminate in a telephone switchboard, then switches 72 and 73 may be operated to disconnect the microphone 50 and the loud speaker 70, and to connect the telephone switchboard equipment 74 to the transceiver so that telephone subscribers may be accessible to the group of mobile or fixed radio stations.

For larger groups of stations when it becomes necessary to employ two sawtooth waves the tens sawtooth generator and channel selector 75 may be connected to the transceiver by the operation of the switch 76 to the same equipment as shown connected to the units sawtooth generator and channel selector. In a still larger group of radio stations another sawtooth generator and channel selector may be connected to the transceiver in a similar manner as shown and described in the above mentioned application.

When initiating a call to another station the dial 77 would be rotated to the number of the desired station, thereby closing a circuit at contacts 78 from the signaling current generator 79 through switch hook contacts 80 to the oscillator 64. The low frequency signaling currents produced at 79 may modulate the intermediate frequency oscillations produced in stage 65, by the oscillator 64 and a carrier wave received through the amplifier 63, to produce a tone in the loud speaker should the selected station be busy. If the called station is not busy then no carrier wave would be received over the selected channel and no tone would be reproduced in the loud speaker. Therefore, the microphone 50 may be removed from the switch hook 81 to close a power supply circuit from battery 82 through the contact springs 83 over conductors 84 and 84′ to the oscillator 53 and the other stages to energize the transmitter 47 for transmitting signals over the selected outgoing channel. The key 85 may supply signaling current to the modulation amplifier 52 to signal the party at the called station, or the called party may be notified of a waiting call by speaking into the microphone 50.

Figure 6:
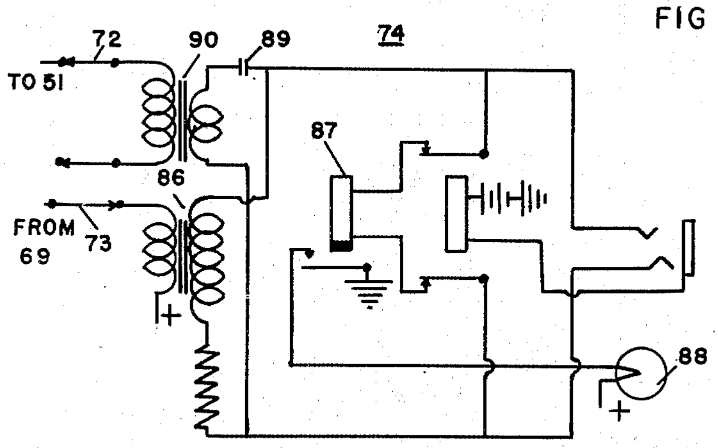
Figure 6 shows a modification of Figure 5 for interconnecting radio channels with telephone lines.

Figure 6 shows the switchboard equipment 74 associated with a transmitter-receiver station in a telephone office so that any conventional well known cord circuit may be utilized to interconnect radio time division channels with telephone lines as explained in connection with Figure 1. Any station may signal an operator through the operation of key 85, Figure 5, to modulate low frequency signals on a carrier wave. These signals may be supplied from the power amplifier 69 in the telephone office station through the transformer 86 to the alternating current relay 87. The relay 87 may be of a slow to release type well known in the art or two relays may be used so that the relay 87 may be energized and maintain its armature in an operated position during signaling in recurring periods to cause the lamp 88 to glow notifying an operator of a waiting call. The operator may connect a cord circuit such as illustrated at 32, Figure 1, and obtain from the calling party the number of a desired telephone subscriber. The outgoing signals from the operator's cord may be through the low impedance path comprising the condenser 89 and primary winding of the transformer 90 to the preamplifier 51, Figure 5. The operator may initiate a call to any fixed or mobile station in the group by selecting the proper numbered channel through the operation of a dial switch similar to 77, Figure 5.

Figure 7:
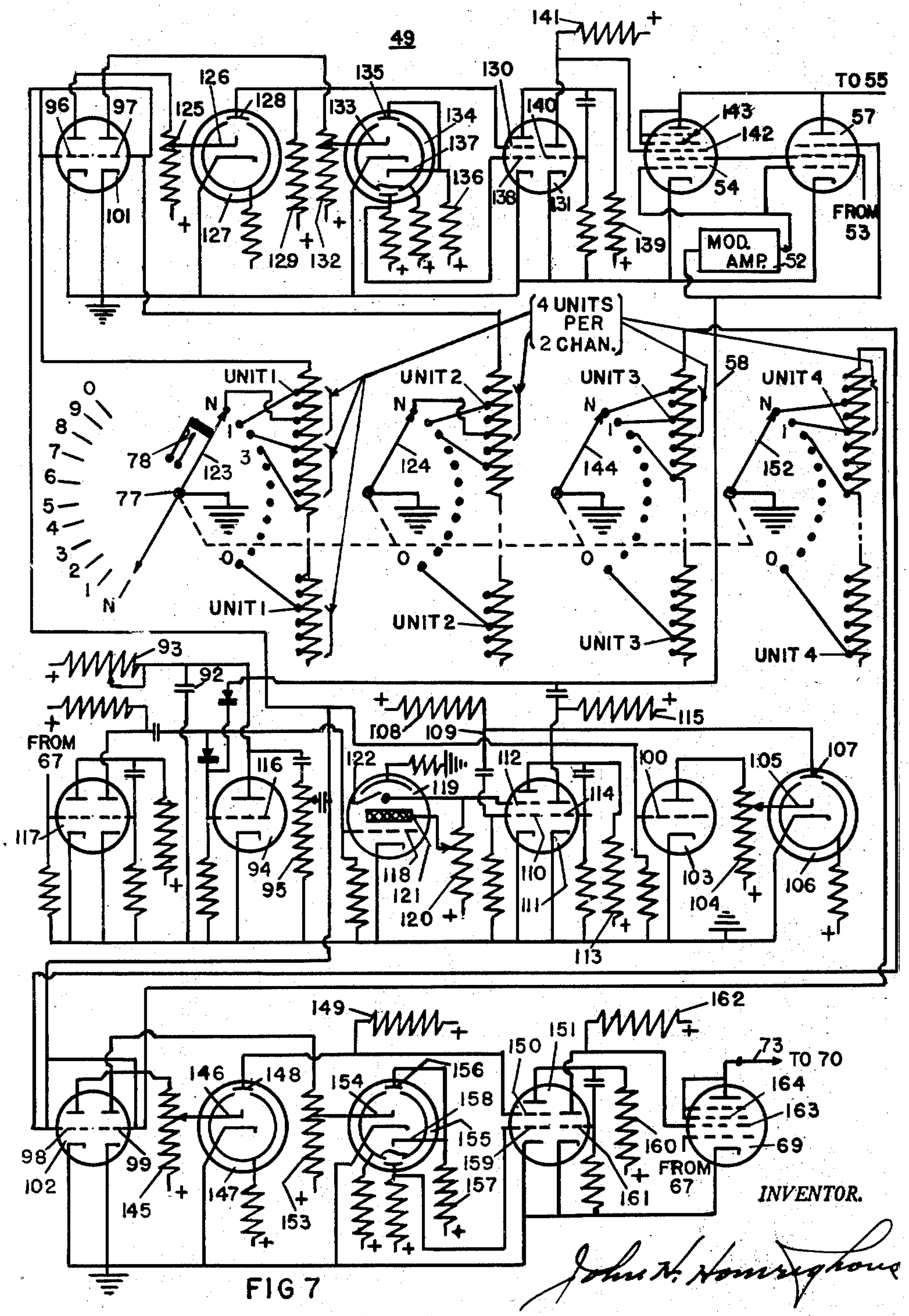
Figure 7 is a schematic circuit for the sawtooth or timing wave generator with selecting mechanisms.

Figure 7 shows the apparatus and associated circuits 49 for producing a series of sawtooth waves and the channel selecting mechanism for utilizing the sawtooth waves to control the selection of different periods of time in each sawtooth wave for the transmission and reception of signals representative of a message.

The sawtooth generator comprises a condenser 92 charged through an adjustable contact on resistor 93 from a source of positive potential as indicated. As the condenser 92 becomes charged the sawtooth voltage in the plate circuit of tube 94 is supplied through an adjustable contact on resistor 95 to the control grids 96, 97, 98, 99 and 100 for tubes 101, 102 and 103.

To initiate the discharge of condenser 92 when no synchronizing signals are received from another station, the sawtooth voltage applied to the grid 100 in tube 103 may be increased to a predetermined value causing a voltage drop through load resistor 104 which may be applied to the control electrode 105 in the off and on relay tube 106. This relay tube is described in Patent No. 2,442,565 issued June 1, 1948. The negative potential on control electrode 105 when the sawtooth potential reaches a certain predetermined value causes the electrons to be deflected or rotated from the anode 107, thereby producing a positive impulse at load resistor 108, which is supplied over conductor 109 to grid 110 in tube 111 which is biased to cut off. Assuming that grid 112 is positive, which is the condition when no control signals are received from another station, then a negative impulse at load resistor 113 may be applied to grid 114 causing a positive impulse at load resistor 115 which is applied to the grid 116 in trigger tube 94 rendering this tube conductive to discharge the condenser 92. The line control or synchronizing impulses may also be applied over conductor 58 to the modulation amplifier 52 and to the power amplifier 57 to render this latter tube conductive for modulating the carrier wave with control signals from the modulation amplifier 52.

Now assume that control signals produced in a distant station are of slightly higher frequency, then control signals received from the second detector 67, Figure 5, through the amplifier 117 may be applied to the grid 116 in the trigger tube 94 causing this tube to become conductive to discharge the condenser 92. These received control signals may also be applied to the grid 118 in the slow acting tube 119 rendering this tube conductive to current through a part of the load resistor 120, luminescent coated anode 121 causing the luminescent material having a relatively short decay period to glow for a short interval after the termination of the received control impulse, thereby exciting the photo cell 122. The photo cell 122 may maintain current through the resistor 120, due to the prolonged glow in the anode, after the duration of the received impulse to hold the grid 112 in tube 110 negative in order to block the control impulse produced in the local station, at resistor 108, from conductor 58 and the amplifiers 52 and 57. By blocking the signals in amplifiers 52 and 57 control signal transmission is prevented from the local station when another station in the group is transmitting control signals at slightly higher frequency. Therefore, the station with the highest frequency synchronizing signals is the controlling station. The slow acting tube is described in Patent No. 2,425,877 issued August 19, 1947.

While I have shown in Figure 7 units equipment only it is to be understood that in a two digit system as shown in Figure 5 the frame control signals may trigger the units sawtooth generator to discharge the condenser 92 at the end of every tenth line in order to keep the line and frame sawtooth waves in proper relation to each other since at the beginning of each frame both the line and frame sawtooth waves will be started at the same time.

The grids 96 and 97 in the tube 101 may be variably biased through the different positions of the dial switch 77 to select different periods in the interval of each sawtooth wave. The bias on grid 96 may cause the left unit of tube 101 to become conductive during different periods depending upon the position of the switch brush 123, which may also cause the transmission of message signals, to be explained presently. The bias on grid 97 may be greater than the bias on grid 96, for the same relative position of the switch brush 124 which is rotated with the brush 123, to cause the right unit of tube 101 to become conductive at the ending of the selected period.

As the voltage on grid 96 increases, the left unit of tube 101 will become conductive at a certain potential in each sawtooth wave depending upon the contact engaged by the brush 123 to produce a voltage drop at resistor 125 which may be applied to the control electrode 126 in relay tube 127 to rotate or deflect the electrons from the anode 128 to increase the potential at load resistor 129. The increase potential at resistor 129 may be applied to the grid 130 in tube 131. The grid 130 is normally negative to block current flow through the left unit of tube 131 until the left unit of tube 101 becomes conductive depending upon the switch position. Therefore, the left unit of tube 131 is blocked to current flow until the sawtooth wave has developed to a selected value depending upon the called number or channel.

As the voltage on grid 97 increases, the right unit of tube 101 will become conductive at a certain potential in each sawtooth wave, depending upon the contact engaged by the brush 124, to produce a voltage drop at resistor 132 which may be applied to the control electrode 133 in relay tube 134. The voltage drop on electrode 133 may deflect the electrons from the anode 135, thereby increasing the potential at resistor 136 which may be applied to the control electrode 137 to produce a voltage drop on grid 138 in tube 131, thus blocking current through the left unit of tube 131. Therefore, from the above description it is shown that the left unit of tube 131 becomes conductive during only a selected period in the sawtooth waves. The grid 130 causing the tube to become conductive and the grid 138 blocking current flow shortly thereafter.

The voltage drop through the load resistor 139 during the period that the left unit of tube 131 is conductive may be applied to the grid 140 causing an increase in potential at load resistor 141 which is applied to the grid 142 in the power amplifier 54, thus permitting the carrier wave produced by oscillator 53, Figure 5, to be modulated with message signals during the selected period in each sawtooth wave. The grids 143 may be connected to tens of hundreds selecting equipment to provide for larger groups of stations.

Therefore, from the above description it is seen that message signals or fragmentary portions of message signals may be transmitted during different recurring periods, and by using tens and hundreds equipment a greater number of stations may transmit intermittently through the same transmission lane or over carrier wave channels having like frequencies.

The grids 98 and 99 in tube 102 may be variably biased through the different positions of the dial switch 77 to select different periods in the interval of each sawtooth wave. The bias on grid 98 may cause the left unit of tube 102 to become conductive during different periods in the interval of each sawtooth wave depending upon the position of the switch brush 144, which may also condition the receiver equipment for the reception of message signals to be explained presently. The bias on grid 98 may be greater than the bias on grid 97, for the same relative position of the switch brush 144 which is rotated with the brushes 123 and 124.

As the voltage on grid 98 increases the left unit of tube 102 may become conductive at a certain potential in each sawtooth wave depending upon the contact engaged by the brush 144 to produce a voltage drop at resistor 145 which may be applied to the control grid 146 in relay tube 147 to deflect the electrons from the anode 148 to increase the potential at resistor 149. The increase potential at resistor 149 may be applied to the grid 150 in tube 151. The grid 150 is normally negative to block current through the left unit of tube 151 while message signals are being transmitted, or until the left unit of tube 102 becomes conductive, depending upon the switch position. Therefore, the left unit of tube 151 is blocked to current flow until the sawtooth wave has developed to a selected value depending upon the incoming channel selected.

As the voltage on grid 99 increases, the right unit of tube 102 will become conductive at a certain potential in each sawtooth wave, depending upon the contact engaged by the brush 152, to produce a voltage drop at resistor 153 which may be applied to the control electrode 154 in relay tube 155. The voltage drop on electrode 154 may deflect the electrons from the anode 156, thereby increasing the potential at resistor 157 which may be applied to the control electrode 158 to produce a voltage drop on grid 159 in tube 151, thus blocking current through the left unit of tube 151. Therefore, from the above description it is shown that the left unit of tube 151 becomes conductive during only a selected period in the sawtooth waves. The grid 150 causes the left unit of tube 151 to become conductive and the grid 159 blocks current flow shortly thereafter.

The voltage drop through the load resistor 160 during the period that the left unit of tube 151 is conductive may be applied to the grid 161 causing an increase in potential at load resistor 162 which may be applied to the grid 163 in the power amplifier 69, thus permitting message signal amplification in tube 69 during the selected period in each sawtooth wave. The grids 164 may be connected to tens and hundreds selecting equipment so that message signals may be received from a greater number of stations.

Therefore from the above description it is seen that message signals or fragmentary portions of message signals may be reproduced during different recurring periods, and by using tens and hundreds equipment message signals from larger groups of stations may be received intermittently through the same transmission lane or over carrier wave channels of the same wave length.

The dial switch 77 may be rotated to different positions to select an outgoing channel and an incoming channel or to select transmitting periods and receiving periods. In other words the calling station may transmit signals during a certain selected period in each sawtooth wave and receive signals during a later selected period in each sawtooth wave. In order that one station may call another station each station dial switch may be rotated after each call to its normal or standby position. The brushes are then connected to the bias resistor so that a called station may be capable during each sawtooth wave of receiving signals before transmitting signals, which means that a calling station may transmit signals over a selected outgoing carrier wave channel which becomes an incoming carrier wave channel at the called station with its dial switch in standby position.

Assuming that the transceiver shown in Figure 5 is station number 1 in a group, then the dial switch in its standby or normal position would connect the lowest unit of bias resistance for station 1 through brush 144 to the grid 98 in receiver equipment tube 102 and the grid 99 through the next lowest unit of bias resistance for station 1 and brush 152, as shown in Figure 7, to provide an incoming channel for the called station. Brush 123 would connect the next highest unit of bias resistance to the grid 96 and the brush 124 would connect the highest unit of bias resistance for station 1 to the grid 97 to provide an outgoing channel to the calling station. The bias resistors in other stations may be connected in a similar manner to their standby dial switch contacts in accordance with their assigned number.

In the various circuits shown and described I have simplified the drawings by indicating the source of potential by a sign. Also I have omitted the heater filaments for the various tubes, but it will be understood that both filaments are necessary.

The embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

Having thus described my invention, I claim:

1. In a communication system, a plurality of radio stations, means at a first one of said stations to produce successive sawtooth waves, means at said first station including a calling device and suitable circuits controlled thereby to select an outgoing channel comprising a certain period of time in each of the said sawtooth waves and an incoming channel comprising another period of time in each of the said sawtooth waves for two-way communication between said first station and a second one of said stations.

2. In a radio communication station, means to produce successive timing waves, means including a calling device and suitable circuits controlled thereby to select an outgoing channel comprising a certain period of time in each of the said timing waves and an incoming channel comprising another period of time in each of the said timing waves, means to produce a carrier wave, means to modulate said carrier wave with signals representative of a message, means to transmit portions of said modulated carrier wave through said outgoing channel, and means to receive other message signals through said incoming channel.

3. In a radio communication station, means to produce successive timing waves, means including a multi-position dial switch and associated circuits controlled thereby to select an outgoing channel comprising a certain period of time in each of the said timing waves and an incoming channel comprising another period of time in each of the said timing waves, means to produce a carrier wave, means to modulate said carrier wave with signaling current signals, means to modulate said carrier wave, following signaling current signal modulation, with message signals representative of a first message, means to transmit portions of said modulated carrier wave through said outgoing channel, and means to receive other message signals representative of a second message in answer to said first message through said incoming channel.

4. In a communication system, a plurality of radio stations, means at a first one of said stations to produce successive sawtooth waves, means at said first station including a multi-position dial switch and associated circuits to select an outgoing channel and an incoming channel comprising two consecutive periods of time in each of the said sawtooth waves for two-way communication between said first station and a second one of said stations.

5. In a communication system, a plurality of radio stations, means at a first one of said stations to produce successive sawtooth waves including control signals to terminate the waves, means at said first station including a multi-position dial switch and associated circuits controlled thereby to select an outgoing channel and an incoming channel comprising two consecutive periods of time in each of the said sawtooth waves for two-way communication between said first station and a second one of said stations.

6. The communication system as claimed in claim 5 including means to transmit said control signals through another channel comprising other periods of time in each of the said sawtooth waves.

7. In a communication system, a plurality of radio stations, means at a first one of said stations including a multi-position dial switch and associated circuits controlled thereby to select an outgoing channel and an incoming channel for two-way communication between said first station and a second one of said stations.

8. In a radio communication station, means to produce successive sawtooth waves, means including a calling device and suitable circuits controlled thereby to select any pair of a number of pairs of outgoing and incoming channels for two-way conversation, each of the said pairs of channels comprising two different consecutive periods of time in each of the said sawtooth waves.

9. In a communication system, a plurality of numerically designated radio stations, means at a first one of said stations to produce successive sawtooth waves, means at said first station to call any other one of said stations by its number, said last means comprising a multi-position dial switch and associated circuits to select any pair of a plurality of pairs of outgoing and incoming channels, each of the said pairs of channels numbered to correspond to a different station number and comprising two different consecutive periods of time in each of the said sawtooth waves.

10. In a radio transmitter-receiver station, means to produce successive timing waves, means including a multi-position switch and suitable circuits controlled thereby to select at least two recurrent periods in said timing waves, means to transmit signals representative of a message during a first one of said recurrent periods, and means to receive signals representative of a return message during a second one of said recurrent periods.

11. In a communication system, a first radio transmitter-receiver station, means to produce successive sawtooth waves including control signals to terminate the waves, means including a calling device and suitable circuits controlled thereby to select at least two recurrent periods in said sawtooth waves, means to transmit signals representative of a message during a first one of said recurrent periods, means to transmit said control signals during another recurrent period, a second radio transmitter-receiver station, means at said second station to produce other sawtooth waves under control of said control signals, means at said second station to transmit signals representative of a return message during a second one of said recurrent periods under control of said other sawtooth waves.

12. In a mobile transmitter-receiver radio station, means to produce successive sawtooth waves, means comprising a calling device rotatable in accordance with a station call designation to select a similarly designated outgoing channel comprising a first recurring period of time in said sawtooth waves and an incoming channel comprising a second recurring period of time in the said sawtooth waves, means to transmit signals representative of a message in said first recurrent period, and means to receive signals representative of a return message in said second recurrent period.

13. In a communication system, a mobile transmitter-receiver station, means to produce successive sawtooth waves, a numerically designated distant mobile station, means at said transmitter-receiver station comprising a calling device rotatable in accordance with the number of said distant station to select an outgoing channel assigned to said distant station comprising a first recurring period of time in said sawtooth waves and an incoming channel from said distant station comprising a second recurring period of time in the said sawtooth waves, means to transmit signals representative of a message in said first recurrent period, and means to receive signals representative of a return message in said second recurrent period.

14. In a radio communication system, a first transmitter-receiver station, means to produce successive sawtooth waves, a numerically designated distant transmitter-receiver station, means at said first station comprising a calling device rotatable in accordance with the number of said distant station to select an outgoing channel assigned to said distant station comprising a first period of time in each of the said sawtooth waves and an incoming channel from said distant station comprising a second period of time in each of the said sawtooth waves, means at said first station to produce a carrier wave, means to modulate said carrier wave with signals representative of a message, means to transmit fragmentary portions of said modulated carrier wave during said first periods, and means to receive fragmentary portions of another carrier wave modulated with signals representative of a return message during said second periods.

15. In a radio communication system, a first transmitter-receiver station, means to produce successive sawtooth waves including control signals to terminate the waves, a second transmitter-receiver station numerically designated, means at said first station comprising a calling device rotatable according to the number of said second station to select an outgoing channel assigned to said second station comprising a first period of time in each of said sawtooth waves and an incoming channel from said second station comprising a second period of time in each of the said sawtooth waves, means at said first station to produce a first carrier wave, means to modulate said carrier wave with signals representative of a message, means to transmit fragmentary portions of said modulated carrier wave during said first periods, means to transmit said control signals modulated on said carrier wave during another period of time in each of the said sawtooth waves, means at said second station to produce other successive sawtooth waves under control of said control signals, means at said second station to produce a second carrier wave, means to modulate said second carrier wave with signals representative of a return message, means under control of said other sawtooth waves to transmit fragmentary portions of said second modulated carrier wave during said second periods, and means at said first stations to receive said fragmentary portions of said second modulated carrier wave.

16. In a radio transmitter-receiver station, means to produce at least two series of sawtooth waves, means comprising a calling device and suitable circuits controlled thereby to select an outgoing channel comprising a first recurring period of time under control of both of said sawtooth waves and an incoming channel comprising another recurring period of time under control of both of said sawtooth waves for the transmission and reception respectively of signals representative of different messages.

17. In a communication system, a first group of stations and a second group of stations, means at a first station in said first group to produce a first and a second carrier wave, means at said first station including a calling device and suitable circuits controlled thereby to select an outgoing channel and an incoming channel, comprising different recurring periods of time, in either said first or said second carrier wave, means to signal a second one of said stations in either said first group or said second group of stations according as signals are transmitted through an outgoing channel in said first carrier wave or through an outgoing channel in said second carrier wave, and means to receive signals from one of said incoming channels.

18. In a transmitter-receiver radio station, means to produce a carrier wave, means comprising a calling device and suitable circuits controlled thereby to produce successive sawtooth waves, means to select an outgoing channel and an incoming channel comprising first and second periods of time in each of the said sawtooth waves, means to modulate said carrier wave with signals representative of a message, means to transmit fragmentary portions of said modulated carrier wave during said first periods, said last means also suppressing said modulated carrier wave during other periods of time in said sawtooth waves, and means to receive fragmentary portions of another modulated carrier wave during said second periods.

19. In a communication system, a radio transmitter-receiver station, means at said station to produce successive sawtooth waves including control signals to terminate the waves, means to select an outgoing channel and an incoming channel comprising two different periods of time in each of the said sawtooth waves for the transmission and reception of message signals, means to transmit said control signals during another period of time in each of the said sawtooth waves and circuit control means to block the transmission of said control signals upon reception of other control signals.

20. In a communication system, a radio transmitter-receiver station, means at said station to produce successive sawtooth waves, means to select an outgoing channel and an incoming channel comprising two different periods of time in each of the said sawtooth waves for the transmission and reception of message signals, a signal generating device and means including said device to produce an audible tone if the selected incoming channel is busy.

21. In a communication system, a plurality of radio stations, means at a first one of said stations including a manually operable calling device with apparatus and suitable circuits controlled thereby to select an outgoing channel comprising a recurring period of time and an incoming channel comprising another recurring period of time for two-way communication between said first station and a second one of said stations.

22. In a communication system, a plurality of numerically designated radio stations each having an incoming and an outgoing channel, apparatus and suitable circuits at a first one of said stations including a multi-position station calling device movable in accordance with the number of a second one of said stations to select the said incoming and outgoing channel for said second station.

23. In a communication system, means including a manually operable calling device with apparatus and suitable circuits controlled thereby to select an outgoing channel comprising a recurrent period of time, means to produce a carrier wave, and means including a modulation amplifier to transmit said carrier wave amplitude modulated with signals representative of a message through said outgoing channel.

24. In a communication system, a plurality of numerically designated radio stations each having a different call channel comprising a recurrent period of time, means at a first one of said stations to produce a carrier wave, means at said first station including a multi-position station calling device rotatable in accordance with the number of a second one of said stations to select the said call channel to the said second station, and means including a modulation amplifier to transmit said carrier wave amplitude modulated with signals representative of a message through said outgoing channel.

25. In a radio transmitter-receiver station, means including a calling device and suitable circuits controlled thereby to select an outgoing channel comprising a recurring period of time and an incoming channel comprising a different recurring period of time for message signal transmission and reception respectively, means to produce synchronizing pulses having a predetermined time relation to said periods, means to transmit said synchronizing pulses during another recurring period of time, and circuit control means to block the transmission of said synchronizing pulses upon reception of other synchronizing pulses.

26. In a radio transmitter-receiver station, means including a calling device and suitable circuits controlled thereby to select an outgoing channel comprising a recurring period of time and an incoming channel comprising a different recurring period of time for two-way conversation, a device to produce relatively low frequency signals and means to utilize said signals to produce an audible tone if the selected incoming channel is busy.

27. A communication system as claimed in claim 22 and in addition there is provided a land line having a telephone station, with means at said second station including a cord circuit to transfer signals between said channels and said land line for two-way communication between said first station and said telephone station.

28. A communication system as claimed in claim 4 and in addition there is provided a land line extending from said second station to a telephone office with means at said second station including a cord circuit to transfer signals between said channels and said land line for two-way communication between said first station and said telephone office.

29. In a radio communication system, a group of numerically designated stations, a pair of electron tubes at a first one of said stations, means at said first station to supply timing wave potentials to said tubes, a rotatable calling device at said first station to adjust control grid bias for said tubes, according as said device is rotated to the number for a second one of said stations, to select a pair of channels comprising two consecutive recurring periods of time in said timing wave for two-way communication between said first station and said second station.

30. In a radio communication system, a plurality of transmitter-receiver stations, means at a first one of said stations for generating regularly recurring synchronizing pulses, means to transmit said synchronizing pulses, means at said first station under control of said synchronizing pulses, including a manually operable calling device, to select an outgoing channel and an incoming channel comprising two consecutive recurring periods of time for two-way communication between said first station and a second one of said stations, means at a third one of said stations to receive said synchronizing signals, and means at said third station under control of said synchronizing signals, including another manually operable calling device, to select an outgoing channel and an incoming channel comprising another two consecutive recurring periods of time for two-way communication between said third station and a fourth one of said stations.

31. In a multi-channel pulsed carrier wave communication system, the method of communication which comprises producing a series of regularly recurring synchronizing pulses, selecting first and second recurring periods in the intervals between said pulses, producing a carrier wave, modulating said carrier wave with signals representative of a message, transmitting fragmentary portions of said modulated carrier during said first period, suppressing said modulated carrier wave during said second period, and receiving fragmentary portions of another modulated carrier wave during said second period.

32. In a communication system, a transmitter-receiver station, means at said station to produce timing waves under control of received recurring pulses, a manually operable multi-position dial switch and station circuits controlled by said switch in normal position to select a first recurring period of time in the interval of each of the said timing waves for the reception of message signals and to select a second recurring period of time in the interval of each of the said timing waves for the transmission of other message signals.

JOHN H. HOMRIGHOUS.

REFERENCES CITED

The following references are of record in the file of this patent:

UNITED STATES PATENTS

| Number | Name | Date |
|---|---|---|
| 2,036,350 | Montani | Apr. 7, 1936 |
| 2,146,876 | Zworykin | Feb. 14, 1938 |
| 2,172,354 | Blumlein | Sept. 12, 1939 |
| 2,236,015 | Sonnentag | Mar. 25, 1941 |
| 2,406,165 | Schroeder | Aug. 20, 1946 |